United States Patent [19]

Lipsky

[11] 4,214,316
[45] Jul. 22, 1980

[54] METHOD AND APPARATUS FOR SYNCHRONOUSLY TUNING THE MULTI-CHANNEL SUPERHETERODYNE RECEIVER OF A DF SYSTEM

[75] Inventor: Stephen E. Lipsky, East Hills, N.Y.

[73] Assignee: General Instrument Corporation, Clifton, N.J.

[21] Appl. No.: 809,196

[22] Filed: Jun. 23, 1977

Related U.S. Application Data

[63] Continuation-in-part of Ser. No. 650,905, Jan. 21, 1976, abandoned.

[51] Int. Cl.$^2$ ............................................. H04B 1/26
[52] U.S. Cl. ................................ 455/141; 343/113 R; 455/147; 455/258; 455/275
[58] Field of Search ............... 325/301, 306, 332–335, 325/63, 370, 373, 390, 391, 416, 452, 453, 423, 436, 437, 439; 343/113 R, 105 LS, 179, 204, 205

[56] References Cited

U.S. PATENT DOCUMENTS

3,449,749  6/1969  McEvoy ............................. 325/336

Primary Examiner—Marc E. Bookbinder
Attorney, Agent, or Firm—James & Franklin

[57] ABSTRACT

Conventional airborne DF systems which process wideband angle of arrival information include at least one remote portion having an antenna and pre-amplification means, located at the wingtip or tail assembly, at which signals are received and processed, and a centrally located portion at which video information is processed and displayed. Each of the remote portions is connected to the central portion by a separate set of video frequency transmission lines. The present invention permits the high sensitivity detection of signals through the synchronous tuning of the channels of a superheterodyne receiver. At each remote portion, a local oscillator signal is produced in accordance with a frequency determining signal which is generated at the central portion. An IF signal is derived from a combination of the signal received by the antenna and the local oscillator signal. The IF signal is transmitted to the central portion and the frequency determining signal is received from the central portion by means of one or more of the video transmission lines. At the central portion, the IF signal is received and processed to derive the required information, which is then displayed. Further, the frequency determining signal is generated and transmitted to each remote portion. In this manner, the local oscillator at each of the remote portions is synchronously tuned without requiring additional RF transmission lines.

46 Claims, 7 Drawing Figures

METHOD AND APPARATUS FOR SYNCHRONOUSLY TUNING THE MULTI-CHANNEL SUPERHETERODYNE RECEIVER OF A DF SYSTEM

This application is a continuation-in-part of my co-pending application Ser. No. 650,905 filed Jan. 21, 1976 entitled METHOD AND APPARATUS FOR SYNCHRONOUSLY TUNING THE MULTI-CHANNEL SUPERHETERODYNE RECEIVER OF A DF SYSTEM, now abandoned.

The present invention relates to radar receiving systems of the direction finding (DF) type and, more particularly, to a method and apparatus for synchronously tuning the multi-channel superheterodyne receiver of a DF system.

Conventional direction finding systems designed for use on aircraft and the like typically include a plurality of RF band spiral antennas. The antennas are located at the extremities of the craft, such as at the wingtips and the tail sections. Commonly, four separate antennas are utilized, one at each wingtip and one at the end of each of the tail sections, which provide 360° coverage, with each antenna providing approximately 90° of unique view.

Such a system may produce a DF measurement through the use of an amplitude monopulse system. A signal is received by the antenna array. The signal is processed, a determination is made of which of the antennas receives the strongest signal and the direction of arrival is noted. The antenna associated with the next strongest channel, which will normally be physically adjacent to the antenna of the strongest channel, is determined and a ratio of the strongest signal to the next strongest signal is formed. The formation of this ratio normalizes the signal, thus removing the effect of the signal pulse-to-pulse scan or glint variation and provides a voltage that is proportional to the distance between the antenna patterns. This voltage is then utilized as an input for a display system as well as to calculate the direction bearing and location of the signal emitter.

A simple type of receiver, which can be used in the system described above, usually consists of an antenna, which typically covers the 2 to 18 GHz band, a multiplex filter capable of dividing the reception range into four sub-ranges: 2 to 4 GHz, 4 to 8 GHz, 8 to 12 GHz 12 to 18 GHz and one or more signal detectors which are connected at the output of the multiplex filter, to detect the signals in each range. Each wingtip or tail installation, therefore, constitutes a signal receiver which receives the signals, divides them into the appropriate frequency bands and detects the signals. The comparison of the detected signals from each remote receiver is generally made at a central location which can be situated in the fuselage of the aircraft. The detected signals are usually video amplified at each of the remote portions and then fed to the central location by means of the appropriate video transmission lines. The video range is utilized to transmit the signals in order to minimize the cable loss. This system can provide an RF operating sensitivity in the order of −40 dBm, due chiefly to the characteristics of the detectors utilized therein.

In such a system, the antenna must be mounted in very close proximity to the remainder of the receiver in each of the remote locations in order to reduce RF signal losses. The process of detection and video amplification is accomplished at each of the remote locations in order to improve the signal-to-noice ratio and to overcome the video feed cable loss. In such systems, the use of RF signal detectors at the central location was considered not to be feasible because the length of RF cable required would be substantial, thereby causing large signal losses. Providing the necessary RF amplification to compensate for these signal losses is impractical, making such a system untenable. However, when the RF signal is detected and converted into a signal in the video range (typically 2 MHz), the signals can be fed back to the central location without undue loss and, thus, the system becomes practical.

The conventional direction finding system, as described above, is "wide open", i.e., capable of receiving signals over a wide RF bandwidth. The measurement of the angle of arrival in such a system requires that two or more channels of detection exhibit similar loss characteristics to permit any amplitude differences between the channels to accurately represent the differences established by the antenna patterns. However, in many applications, it is desirable to use one or more narrow bandwidth channels to make the required amplitude comparison, as the use of one or more narrow bandwidth channels permits a higher sensitivity to be attained. Higher sensitivity, even in a narrow bandwidth, may be an extremely desirable characteristic because such a system may be utilized to obtain a more accurate angle of arrival measurement of a relatively weak signal received by the wide band receiver.

However, when narrow bandwidth, high sensitivity systems are attempted, certain problems in tuning the receivers at each of the remote locations are encountered. If each of the channels had an independent local oscillator, and if one of the channels were slightly mistuned with respect to the other, the signal which was in tune or centered in one channel could conceivably appear on the skirts of the other. If this were to occur, there would be an amplitude output difference which would not be due to the antenna pattern differences in the channels, but due to an error in the tuning of the channels, thereby causing an inaccurate bearing determination. For this reason, it is required that precisely the same local oscillator frequency be utilized for each channel in a high sensitivity, narrow bandwidth multi-channel system.

However, since the RF channels must be located in wingtip locations or along tail structures adjacent the antennas to reduce RF loss, the problem of synchronizing the local oscillators is difficult. If a single local oscillator were to be installed at the central location with the purpose of distributing its output to each of the antenna associated RF channels, the cable losses would be excessive at higher microwave frequencies. Thus, this solution is not feasible.

It is, therefore, a prime object of the present invention to provide method and apparatus for synchronously tuning the multi-channel superheterodyne receiver of a DF system wherein the local oscillator at each remote location is tuned by means of a frequency determining signal generated at the central location and transmitted to each of the remote locations along the existing video transmission lines.

It is another object of the present invention to provide a method and apparatus for synchronously tuning the multi-channel superheterodyne receiver of a DF system wherein a comb generator provides contiguous oscillator frequency coverage in response to the variations of the frequency determining signal.

It is a further object of the present invention to provide a method and apparatus for synchronously tuning the multi-channel superheterodyne receiver of a DF system wherein the frequency determining signal is situated at a lower frequency than the highest frequency required by the local oscillator so as to permit the use of existing video transmission lines as RF cables in a given installation, thus offering a substantial cost advantage.

It is still another object of the present invention to provide a method and apparatus for synchronously tuning the multi-channel superheterodyne receiver of a DF system wherein a wide bandwidth contiguously swept local oscillator signal is developed at each remote location through the use of a variable frequency comb generator preferably in the form of a step recovery diode.

It is a still further object of the present invention to provide method and apparatus for synchronously tuning the multi-superheterodyne receiver of a DF system wherein the frequency determining signal and the IF detection signals are multiplexed onto existing video transmission lines.

It is still another object of the present invention to provide a method and apparatus for synchronously tuning the multi-channel superheterodyne receiver of a DF system wherein prioritization of the sweep of the frequency determining signal operating in conjunction with the pre-selection tuning can be used to cover all or selected portions of the frequency band, as required.

It is a still further object of the present invention to provide a method and apparatus for synchronously tuning the multi-channel superheterodyne receiver of a DF system wherein the IF information from each of the remote locations can be sequentially received and processed by the central portion to permit time sharing, as a cost reduction method.

It is still another object of the present invention to provide a method and apparatus for synchronously tuning the multi-channel superheterodyne receiver of a DF system wherein existing antennas can be utilized to provide additional channels of reception.

The present invention pertains to direction finding systems of the type having at least one remote first portion at which signals are received and processed, including an antenna and pre-amplification means and a second, centrally located portion at which video information is displayed. The remote and central portions are connected by a set of video frequency transmission lines. In accordance with the present invention, provided as part of the first portion are: means for generating a local oscillator signal in accordance with a frequency determining signal; means for generating an IF signal in accordance with the signal received by the antenna and the local oscillator signal; means operably connected to one or more of the transmission lines for transmitting the IF signal on the transmission lines and means operably connected to said one or more of the transmission lines for receiving the frequency determining signal therefrom. Provided as part of the second portion are: means for processing the IF signal; means for generating the frequency determining signal; means operably connected to said one or more of the transmission lines to transmit the frequency determining signal thereon and means operably connected to said one or more transmission lines to receive the IF signal therefrom.

The frequency determining signal is preferably generated in the form of a sweeping pilot signal. The local oscillator signal generating means, located at each remote location, preferably comprises a comb generator or other multiplier type of generator which is responsive to the sweeping pilot signal. For the comb generator, as the sweeping pilot signal is swept over an octave, the tines of the comb generated by the comb generator vary in frequency to cover all of the desired frequencies in a given spectrum or range of frequencies. The comb generator preferably comprises a step recovery diode. The pilot signal has a frequency range which is selected in accordance with the attenuation characteristics of the transmission lines such that this signal can be transmitted from the central location to the remote portions without undue loss.

The intermediate frequency signal generating means preferably comprises band preselecting means which are operably connected to the antenna and a mixer connected to receive the output of the preselecting means and the local oscillator signal and to combine same to form the intermediate frequency signal. The operation of the band preselecting means is controlled by a drive signal which is generated at the central location and transmitted to each of the remote locations by means of the respective sets of transmission lines in a manner similar to that of the frequency determining signal. The means operably connected to one or more transmission lines to receive the frequency determining signal also comprises means for receiving the drive signal. In this manner, not only can the local oscillators in each of the remote portions be synchronized, but the central portion also can control the band preselection apparatus in each of the remote portions such that band selection can be accomplished in each of the channels simultaneously.

Where a number of different remote portions are utilized, each is connected to the central portion by means of a separate set of transmission lines. One aspect of the present invention relates to time sharing means, located in the central portion, which is connected to permit receipt of the intermediate frequency signals on each set of transmission lines in sequence. In this manner, the signals on each channel can be processed sequentially, eliminating the necessity of the duplication of parts, thereby enhancing the economic feasibility of the system.

To the accomplishment of the above and to such other objects as may hereinafter appear, the present invention relates to a method and apparatus for synchronously tuning the multi-channel superheterodyne receiver of a DF system as set forth in the appended claims and as described in the specification taken together with the accompanying drawings wherein like numerals refer to like parts and in which:

Figures 1, 5:
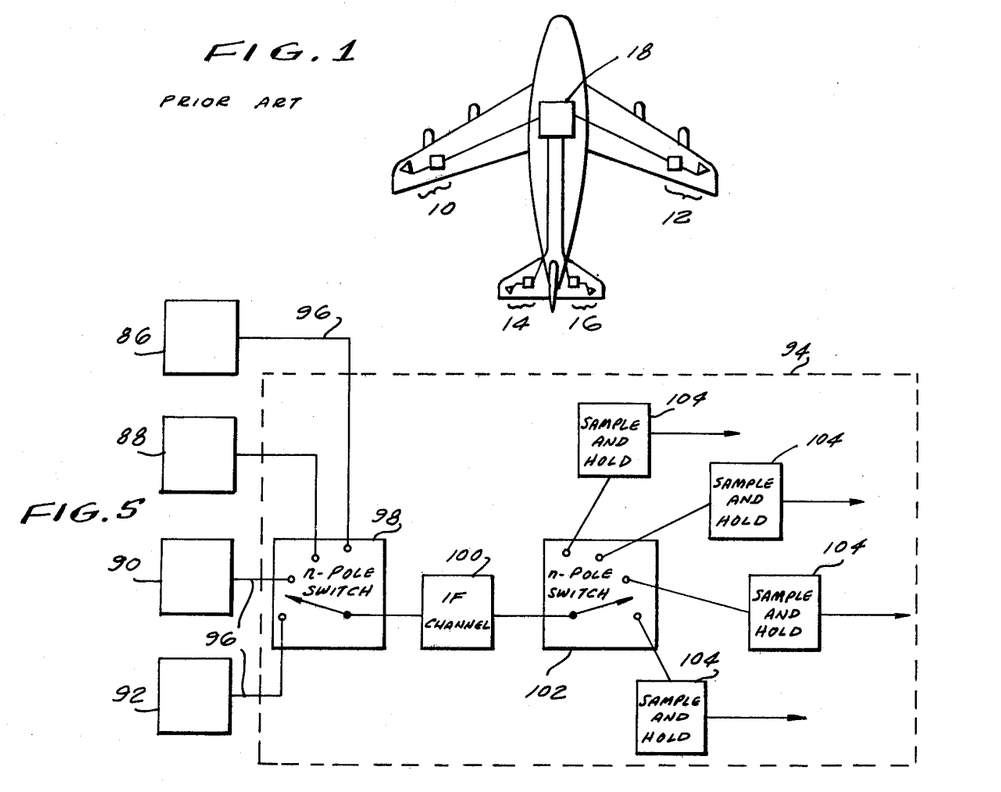
FIG. 1 is a semi-schematic diagram of the layout of a conventional airborne DF system.
FIG. 5 is a block diagram of an alternate embodiment of the receiver of the present invention having time sharing capability.

FIG. 1 shows schematically the basic layout of a conventional wide bandwidth direction finding system within an aircraft. In this case, four remote receiving portions, each of which is independent of the others, is utilized, portions 10 and 12 being located one at each wingtip and portions 14 and 16 being located one in each tail section. Each of the remote portions is connected to a central video display portion 18 by means of a separate set of video transmission cables. Each of the remote portions 10, 12, 14, 16 comprises an antenna and the appropriate RF signal processing and detection equipment, as well as video amplification means.

More specifically, each of the antennas covers a frequency range of from 2 to 18 GHz. The processing equipment connected to each antenna comprises a multiplex filter which separates the reception range into four different sub-ranges covering 2 to 4 GHz, 4 to 8 GHz, 8 to 12 GHz and 12 to 18 GHz, respectively. In addition, one or more signal detectors are connected to the output of the multiplex filter to detect the signals in each range. The detected signals are then video amplified and transmitted along the set of video transmission lines to the central location wherein further processing takes place and the video signals are displayed.

The present invention utilizes video transmission lines as RF lines through the use of a novel configuration which places the signal loss, that normally would occur if the RF signal were transmitted through the video cables, in series with the local oscillator rather than in series with the RF signal detector. In order to achieve this result, the conventional receiver, as described above, has been improved to additionally function as a superheterodyne receiver.

As previously noted, conventional systems covered bands 2 to 4 GHz, 4 to 8 GHz, 8 to 12 GHz and 12 to 18 GHz on an instantaneous band by band basis. However, the present invention scans a 1 MHz window across each of the bands, and thus, is capable of narrow bandwidth reception having the advantages of higher sensitivity and enhanced signal separation in a dense environment. Synchronous tuning of the local oscillators at each remote location is accomplished by generating, at the central location, a pilot signal which sweeps a given frequency range to control each local oscillator. This signal is fed through each set of preexisting video transmission lines such that each channel is simultaneously tuned. The sweeping local oscillator signal is achieved at each remote location through the use of a comb generator which produces the local oscillator signal in response to the pilot signal.

Figure 2:
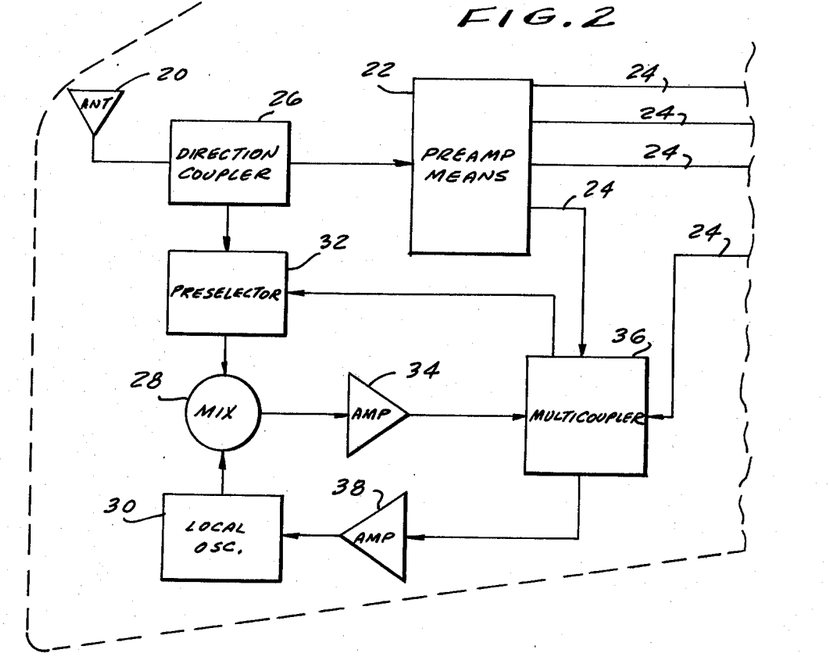
FIG. 2 is a block diagram of a remote portion of the receiver of the present invention.

FIG. 2 is a block diagram of one of the remote locations in accordance with the system of the present invention. Like the conventional systems, the remote portion of the present invention consists of an antenna 20 which is connected to a pre-amplification means 22. Contained in the pre-amplification means 22 is a multiplex filter and one or more signal detectors. The antenna typically covers a frequency range of from 2 to 18 GHz and the multiplex filter separates the signal into frequency ranges of 2 to 4 GHz, 4 to 8 GHz, 8 to 12 GHz and 12 to 18 GHz, respectively. The detectors are connected to the output of the multiplexer to detect signals in each range. Also included is an amplification means which amplifies the resultant video signal and transmits the video signal by means of a plurality of video transmission lines 24 to the central portion for further processing and display.

The system of the present invention, however, includes a direction coupler 26 interposed between antenna 20 and pre-amplification means 22. Coupler 26 is connected to offer minimum loss in the antenna to preamplifier means path. Direction coupler 26 exhibits low loss in the original signal path, thus maintaining the necessary n-channel signal balance to maintain direction finding accuracy when the wide bandwidth mode is utilized. The high attenuation side of the direction coupler is fed to a balanced mixer 28, the output of which will be an intermediate frequency signal directly proportional to the signal from the direction coupler. The output of the direction coupler is smaller than the output of a local oscillator 30, the output of which is also supplied to the mixer. The output of the mixer will continue to be directly proportional to the output of the direction coupler 26 as long as the local oscillator signal is approximately ten times the strongest signal output of the direction coupler, a consideration readily achievable in the common practice by persons skilled in the art of receiver design.

Interposed between mixer 28 and the output of direction coupler 26 is a tunable band preselector 32 which may be tuned in the range of from 2 to 18 GHz, in accordance with a drive signal generated at the central portion. This band preselector provides a moderate bandwidth (20 to 100 MHz typically) pass band capable of rejecting most of the unwanted band and image frequencies. The output of preselector 32 is fed to mixer 28 where it is combined with the local oscillator frequency output of local oscillator 30 to provide the IF output frequency (100 to 200 MHz typically). The mixer output signal at the intermediate frequency is amplified in amplifier 34 and then multicoupled to the video down lead 24 by means of a multicoupler 36.

The local oscillator signal from local oscillator 30 is generated by a multiplier type of generator, herein depicted as a comb generator, preferably in the form of a step recovery diode, which is fed by an amplifier 38 which receives the frequency determining sweeping pilot signal, preferably in the range of 1 to 2 GHz. This signal, along with the drive signal, is generated at the central aircraft installation and is multiplexed into one or more of the existing video transmission lines 24, thereby making use of the preexisting lines. The frequency of this pilot signal is chosen to be within reasonable loss for attenuation characteristics of the video transmission lines 24. The sweeping pilot signal is received at the remote portion along the same transmission line or lines 24 along which the IF signal is generated and is separated therefrom by multicoupler 36. Amplifier 38 both amplifies and equalizes the signal to compensate for the loss in transmission.

Figure 7:
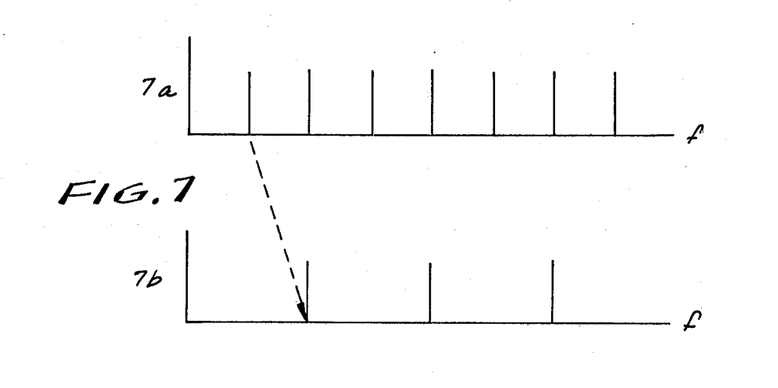
FIGS. 7a and 7b are graphical representations of the output frequencies of the comb generator when the pilot sweep signal input thereto is at a low and high frequency, respectively.

After the amplification, the pilot signal is fed into a step recovery diode within local oscillator 30 which generates a comb of frequencies. The operation of this portion of the invention can be best understood by a reference to FIG. 7 which shows two separate frequency graphs 7a and 7b. When the sweeping pilot signal is at its lowest frequency, the step recover diode contained within local oscillator 30 generates a comb of frequencies such as is shown in FIG. 7a. As the sweeping pilot signal is swept over an octave, the spacing of the comb changes to that of which is shown in FIG. 7b. In effect, by the choice of comb generator and octave sweep, all frequencies in a given range are generated at some time during the sweep of the pilot signal. The tines of the comb are, therefore, varying in spacing and, thus, frequency, to fully cover or fill in all of the frequencies within the total spectrum generating capabilities of the local oscillator.

Figure 4:
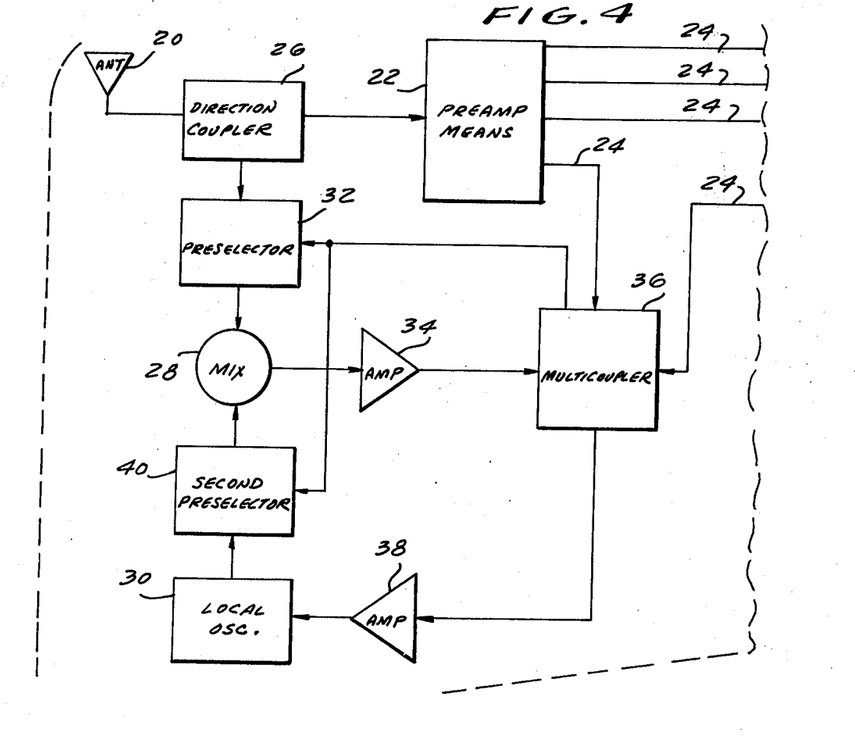
FIG. 4 is a block diagram of an alternate embodiment of the remote portion of the receiver of the present invention.

FIG. 4 shows an alternative embodiment of the remote portion of the present invention. As shown in FIG. 4, all of the components are identical to those shown in FIG. 2 (and are, therefore, labeled similarly) except for the addition of a second band preselector 40 interposed between local oscillator 30 and mixer 28. Preselector 40 provides a tuned resonant tank circuit which is tuned to the desired local oscillator frequency in track with the pilot oscillator and input preselector 32, in accordance with the receipt of the drive signal which is separated from the other signals on the video transmission cable 24 by means of multicoupler 36. In this case, second band preselector 40 is used to select an appropriate comb and increase its output by a resonance or "tank circuit" effect.

The preselectors are synchronized in tuning with the sweeping pilot oscillator to provide continuous coverage. If continuous coverage is not required or undesirable, the entire tuning process can be programmed to favor one or more frequencies or bands of frequencies by programming the preselectors to cover the desired frequencies or bands of frequencies in synchronism with the pilot signal. For example, if 2 to 18 GHz were typically the entire band, the preselector could be programmed to cover a certain portion of this band, say, from 8 to 12 GHz, more often than the other portions of the band, thereby favoring one band, thus prioritizing the coverage.

Figure 3:
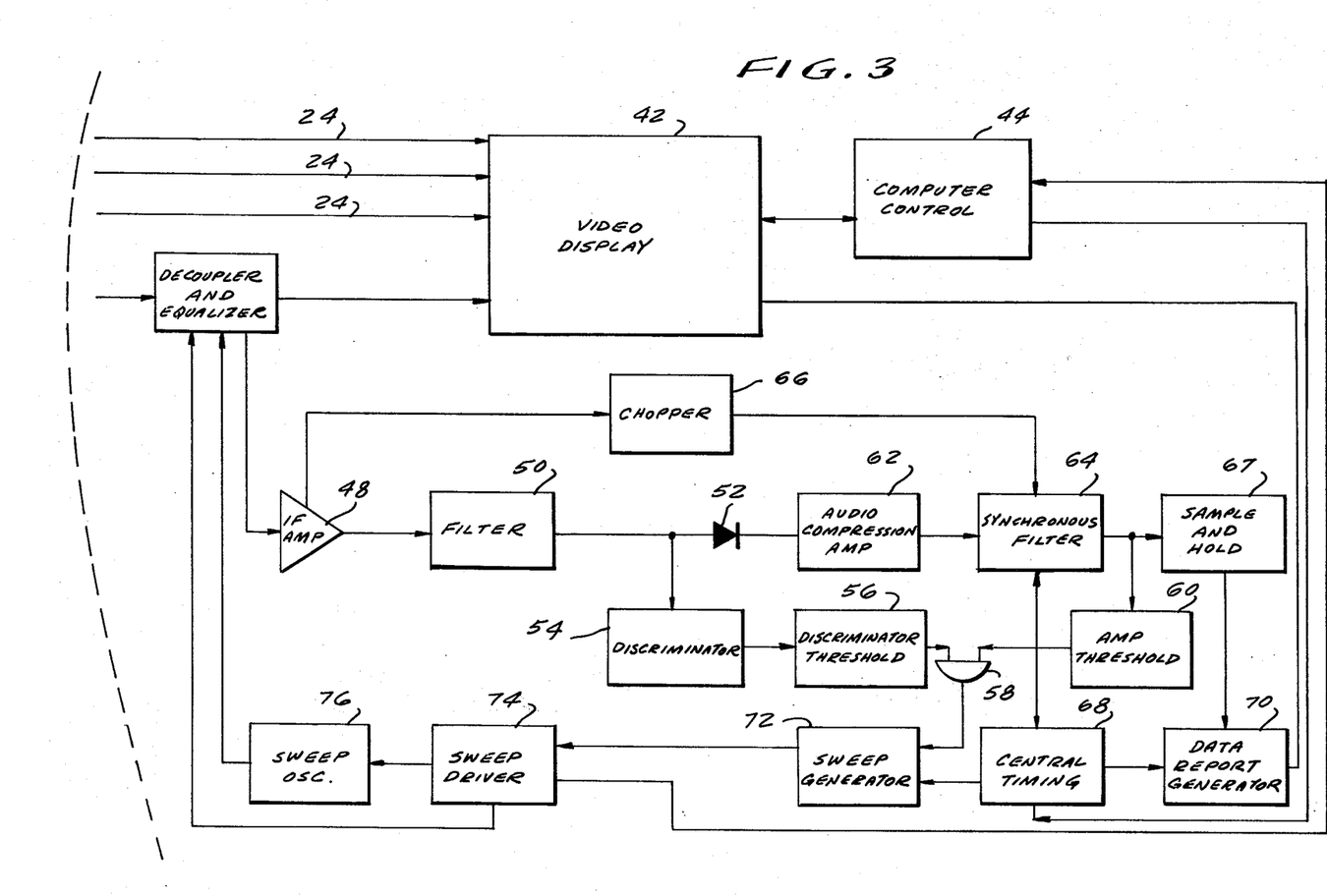
FIG. 3 is a block diagram of the central portion of the receiver of the present invention.

FIG. 3 is a schematic diagram of the central portion of the DF system. Conventional systems of this type comprise, in their central portions, a video display unit which receives the video signals from video transmission lines 24, further processes them and displays the direction finding information. Video display 42 is connected to a master computer control 44 which controls the direction finding equipment.

In the present invention, a decoupler and equalizer circuit 46 is connected between the video transmission line or lines 24 connected to multicoupler 36, and video display 42. Circuit 46 decouples the IF signals resulting from the superheterodyne remote configurations from the video transmission lines, which continue to serve their original purpose, that of feeding wide band video information from the remote pre-amplifiers to the existing receiver. After decoupling of the IF signal, the signal is fed to an IF amplifier 48 and a narrow band (typically 1 MHz) filter 50, after which it is diode detected by diode 52. Amplifier 48 and filter 50 establish the RF receiver bandwidth (1 MHz typically) and provide the required tuning resolution (1 MHz typically) although wider bandwidths consistent with the reception of narrow radar pulses may be used.

A discriminator 54 is connected to receive the output of filter 50 to provide a tuning signal (a zero null when in tune) which centers the receiver by varying the 1 to 2 GHz sweep driven signal in a negative inverse manner to lock on to the received signal. A discriminator threshold circuit 56 is connected to receive the output of discriminator 54. The output of the circuit 56 forms one of the inputs to an AND gate 58. The other input of AND gate 58 is the output of an amplitude threshold circuit 60. Thus, AND gate 58 combines the output of discriminator threshold circuit 56 and amplitude threshold circuit 60 to insure that only signals of acceptable amplitude (signal to noise ratio) are used to provide lockup. For pulse detection, a sample and hold discriminator may be used.

The diode detected signal from diode 52 is fed to an audio compression amplifier 62 which, in turn, feeds a synchronous filter 64. The IF amplifier is chopped at a KHz (2 is typical) rate to permit continuous wave (CW) signals to be synchronously detected by narrow band filter 64. Synchronous filter 64 employs a technique well known in the art, described in *Transistor Circuit Design* by Walston and Miller, McGraw-Hill, 1963, pages 174-175, paragraph 10.5 and is commerically available as part of a linear integrated circuit package from the Signetics Corporation, part No. 5596, which includes a chopper circuit and a synchronous filter, together forming a synchronous detector. When this mode of operation is utilized, the effective band of the receiver becomes that of the synchronous filter (typically 100 Hz) thus improving the overall sensitivity of the apparatus to continuous wave signals. (For pulse type signals, the chopper circuit 66 is not utilized, the bandwidth of amplifier 62 is increased to accomodate the pulse width and/or rise times and the effective bandwidth of the receiver becomes that of the combination IF amplifier 48 and filter 50.) The chopping translates the continuous wave signal to a base band centered about the chopping signal, permitting stable AC coupled amplification to be used as opposed to DC coupled amplification that would normally be required. The output of the synchronous filter 64 is stored in a sample and hold detector 67 and combined with a central timing signal generated by central timing circuit 68 in a data report generator 70 which provides a periodic output which is fed to the existing warning receiver video channel by means of computer control 44 to permit display and use of the result of this entire narrow band, high sensitivity detection process.

Central Timing block 68, data report generator 70 and Computer Control block 44 constitute a well known computer system as described in *Digital Computer Design Fundamentals* by Y. Chu, McGraw-Hill, 1962 and each of these circuits respectively are well known in the art and commercially available. Central Timing block 68 could typically comprise a Signetics 555 timing circuit, in conjunction with anyone of a variety of known counters, such as type SN54192 sold by the Texas Instruments Company. Computer control 44 is typically a memory of the type available from Texas Instruments Company, as No. SN54186, which stores the appropriate program to identify when certain events have or are to take place. Data report generator 70 is an analog switch of the type available from National Semiconductor as part No. AM 1000. Display 42 is a standard output device such as a Tektronix Model 5103N oscilloscope utilizing a Tektronix 5A14N four channel input preamplifier. Similar units are also manufactured by the Hewlett-Packard Company and others. Central Timing circuit 68, data report generator 70, computer control 44 and display 42, being commercially available packages, are connected into the circuit in the manner described by the manufacturer thereof, respectively.

The central timing signal from a central timing circuit 68 and the output of AND gate 58 are fed to a sweep generator 72, the output of which controls a sweep driver 74. Sweep driver 74 generates an output signal of the sawtooth variety which is utilized as the drive signal to control the band preselectors at the remote portions. Thus, the output of sweep driver 74 is connected directly to decoupler and equalizer circuit 46 and also to sweep oscillator 76 which generates the frequency determining signal. The frequency determining signal, which is the output of sweep oscillator 76 is connected to decoupler and equalizer circuit 46. Decoupler and equalizer circuit 46 serves to multiplex the drive signal and sweeping pilot signal onto the transmission lines 24 which are connected to multicoupler 36 at the remote location.

Figure 6:
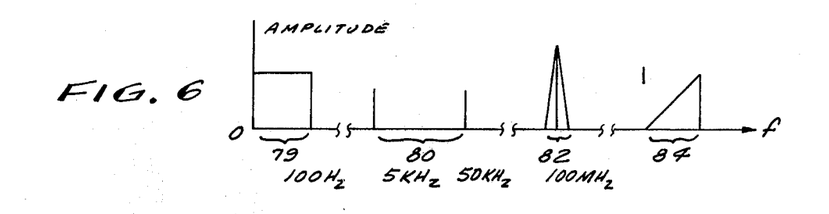
FIG. 6 is a graphical representation of the relative frequencies of the signals transmitted along the video transmission lines of the receiver of the present invention.

The decoupler and equalizer 46 is a collection of standard and well-known filters used to provide combination and separation of the various frequencies as shown in FIG. 6. The low frequency sweep signals to the preselector are separated from the IF output signals by RF filters using techniques well known to those of ordinary skill in the art. Similarly, the video signals originally present on the line are separated from the pilot oscillator microwave signals (1 to 2 GHz typically) by the use of microwave multiplex filters. All of the frequency ranges can be separated and are mutually exclusive. Equalization is provided in this circuit to compensate for the increasing loss of the video lines as a function of seek frequency, as required. The methods and techniques used in the construction of the decoupler and equalizer 46 are described, for example, in the book "Microwave Filters, Impedance Matching Networks and Coupling Structures", by Matthaei, Young and Jones, Page 965 et seq.

FIG. 6 is a graphical representation of the relative frequencies of the various signals which are present on video transmission lines 24. The first portion 79 (starting from the left) of the sketch shows the drive signal, typically between 0 and 100 Hz, which takes the form of a sawtooth type signal. The second portion 80 of the diagram shows the range of the preexisting signals which are transmitted along the video transmission lines, this range being from 5 KHz to 50 KHz. The third portion 82 represents the IF signal which centers about a frequency of approximately 100 MHz. The last portion 84 of the diagram shows the sweeping pilot signal which ranges, preferably, between 1 and 2 GHz.

FIG. 5 shows a schematic representation of how the system of the present invention can be utilized in a time sharing mode. Blocks 86, 88, 90 and 92 each represent a remote portion, such as that illustrated in FIG. 2 or FIG. 4 herein. Each of the remote portions 86, 88, 90 and 92 are connected to the central portion 94 by means of a different set of video transmission lines 96 and, in particular, to an n-pole switch 98 which sequentially couples the transmission lines associated with each of the remote portions, respectively, to the IF channel processing circuitry 100. The output of the IF channel circuitry is connected to a second n-pole switch 102 which sequentially connects it to four separate sample and hold circuits 104 which will, in turn, cause the sequential display of the received information. In this manner, only a single IF channel processing circuit is required and this circuit is time shared to permit processing of signals from each of the four remote portions. The switching range can be slow for the CW signals or may be done on a pulse by pulse basis for pulse intercepts.

The present invention, therefore, is a method and apparatus to synchronize the local oscillation frequencies of a multiple channel DF superheterodyne receiver by means of a centrally generated sweeping pilot signal which is transmitted to a step recovery diode or other type of frequency comb generator located at each remote receiving station. By varying the frequency of the pilot signal and, hence, the spacing of the generated comb, wide band contiguously swept oscillator frequency coverage is provided synchronously at each remote portion. The signals used to control RF generation, the pilot signal and the drive signal, as well as IF detection signals are multiplexed onto and transmitted along existing video lines so that all channels are synchronized without the necessity of additional cables. The pilot signal is at a lower frequency than the highest frequency required by the local oscillator so that the video lines can be used as RF cables. Prioritization of the sweep of the comb generator operating in conjunction with preselection tuning is controlled by a centrally generated sweeping drive signal which can be utilized to cover all or selected portions of the frequency band, as deisred. Further, through the use of time sharing apparatus, a single intermediate frequency processing circuit can be sequenced with each of a plurality of remote portions to permit a single processing circuit to be used with all channels, as a cost reduction method. Moreover, this method permits the existing antennas to be used to provide additional channels of reception.

While only a single preferred embodiment is described herein for purposes of illustration, it is obvious that many variations and modifications can be made thereto. It is intended to cover these variations and modification which fall within the scope of the present invention as defined by the appended claims.

I claim:

1. In an N-channel (N>1) single band DF system of the type having N first portions at which RF signals are received and converted into IF signals, each of said first portions having substantially the same band coverage and including a DF antenna and superhetrodyne detection means and a second portion, wherein IF signals are demodulated and converted into direction finding information, each of said first portions being respectively operatively connected to said second portion by a set of video frequency transmission lines, the improvement comprising, as part of each first portion: means for generating an IF signal in accordance with the signal received by said antenna and a local oscillator signal; means for generating a local oscillator signal in response to a frequency determining signal, said local oscillator signal being continuously frequency variable over a given frequency range; and means operatively connecting said local oscillator means and said IF signal generating means with the set of transmission lines associated therewith, whereby said frequency determining signal is received and transferred to said local oscillator and said IF signal is transmitted along said set of transmission lines, and as part of said second portion; means for processing and demodulating said IF signals and converting same into direction finding information; means for generating said frequency determining signal, said frequency determining signal being continuously frequency variable over a preselected frequency range; and means operatively connecting said frequency determining signal generating means and said IF signal processing means to each of said sets of transmission lines, whereby said frequency determining signal is transmitted over the sets of transmission lines to each of said first portions and IF signals are received from each of the sets of transmission lines.

2. The system of claim 1 wherein said frequency determining signal is a sweeping pilot signal.

3. The system of claim 1 wherein said local oscillator signal generating means comprises a frequency multiplier type of generator.

4. The system of claim 2 wherein said local oscillator signal generating means comprises a comb generator.

5. The system of claim 4 wherein said sweeping pilot signal is swept over an octave, the tines of the comb generated by said comb generator in response to said pilot signal varying in frequency to cover substantially all frequencies of said given frequency range.

6. The system of claim 2 wherein said pilot signal has a frequency range selected in accordance with the attenuation characteristics of said lines.

7. The system of claim 3 wherein said generator comprises a step recovery diode.

8. The system of claim 5 wherein said pilot signal has a frequency range selected in accordance with the attenuation characteristics of said lines.

9. The system of claim 8 wherein said comb generator comprises a step recovery diode.

10. The system of claim 1 wherein said IF signal generating means comprises a band preselecting means operatively connected to said antenna and a mixer operatively connected to receive the output of said preselecting means and said local oscillation signal and to combine same to form said IF signal.

11. The system of claim 10 wherein the output of said band preselected means is controlled by a drive signal.

12. The system of claim 11 wherein said second portion further comprises means for generating said drive signal and wherein said means operatively connecting said frequency determining signal generating means and said IF signal processing means to each of said sets of transmission lines further comprises means operably connecting said drive signal generating means to each of said sets of transmission lines, whereby said drive signal is transmitted over the sets of transmission lines.

13. The system of claim 11 wherein said means operatively connecting said local oscillator and said IF signal generating means with said set of transmission lines further comprises means operably connecting said preselecting means to said set of transmission lines whereby said drive signal is received from said set of transmission lines for receiving said drive signal.

14. The system of claim 10 wherein said IF signal generating means further comprises a direction coupler having an input and output, the input being operatively connected to said antenna, and said output being connected to said preselecting means.

15. The system of claim 1 wherein said means operatively connecting said frequency determining signal generating means and said IF signal processing means to each of said sets of transmission lines comprises a decoupler and signal equalizer.

16. The system of claim 14 wherein said means operatively connecting said frequency determining signal generating means and said IF signal processing means to each of said sets of transmission lines comprises a decoupler and signal equalizer.

17. The system of claim 10 wherein the magnitude of said local oscillator signal is approximately ten times that of the output of said preselecting means.

18. The system of claim 2 wherein said pilot signal sweeps the frequencies between 1 and 3 GHz.

19. The system of claim 2 wherein said pilot signal has a lower frequency than the highest frequency generated by said local oscillator signal generation means.

20. The system of claim 1 further comprising, as part of said second portion, time sharing means connected to permit receipt of the signals of each set of transmission lines sequentially.

21. The system of claim 20 wherein said time sharing means comprises an n-pole switch.

22. The system of claim 10 further comprising second band preselection means operatively interposed between said mixer and said local oscillator signal generation means.

23. The system of claim 11 further comprising second band preselection means operatively interposed between said mixer and said local oscillator signal generation means.

24. The system of claim 23 wherein said second band preselection means is also responsive to said drive signal.

25. The system of claim 1 wherein said IF signal processing means comprises signal detection means and bandwidth limiting means.

26. The system of claim 25 further comprising signal discrimination means and amplitude threshold means.

27. The system of claim 26 further comprising a sweep generator and means for combining the output of said discrimination means and said threshold means to control said sweep generator.

28. The system of claim 24 wherein said IF signal processing means comprises signal detection means and bandwidth limiting means.

29. The system of claim 28 further comprising signal discrimination means and amplitude threshold means.

30. The system of claim 29 further comprising a sweep generator and means for combining the output of said discrimination means and said threshold means to control said sweep generator.

31. The system of claim 30 further comprising a sweep driver and a sweep oscillator, said sweep driver generating said drive signal in accordance with the output of said sweep generator and said sweep oscillator generating said frequency determining signal in accordance with the output of said sweep driver.

32. The system of claim 25 wherein said IF signal processing means comprises means for chopping said IF signal.

33. In a N-channel (N>1) single band DF system of the type having N remote RF signal receiving and IF signal generating portions, each having substantially the same band coverage and each of which includes an antenna and a local oscillator, and a centrally located IF signal processing portion, operatively connected to each of said remote portions by a different set of video transmission lines, a method for synchronizing the frequency of the local oscillator of each of said remote portions, comprising the steps of: generating a local oscillator signal continuously frequency variable over a given frequency range in accordance with a frequency determining signal, combining the signal received at said antenna and the generated local oscillator signal to form an IF signal, transmitting said IF signal over the set of said transmission lines associated with said remote portion, receiving said frequency determining signal from said set of transmission lines, and transferring the received frequency determining signal to the local oscillator; and, at said central portion, the steps of: receiving the IF signal from each of the sets of transmission lines, processing the received IF signals to produce DF information, generating a frequency determining signal which is continuously frequency variable over a preselected frequency range; and transmitting said frequency determining signal over each of the sets of transmission lines.

34. The method of claim 33 wherein the step of generating said frequency determining signal comprises the step of generating a sweeping pilot signal.

35. The method of claim 33 wherein the step of generating the local oscillator signal comprises generating a comb signal.

36. The method of claim 34 wherein the step of generating the local oscillator signal comprises generating a comb signal in accordance with the pilot signal.

37. The system of claim 36 wherein the step of generating a sweeping pilot signal further comprises the step of sweeping the pilot signal over an octave and wherein the step of generating a comb signal comprises the step of varying the frequency of the tines of the generated comb over said given frequency range in accordance with the sweeping of the signal.

38. The method of claim 34 wherein the step of generating the pilot signal further comprises the step of selecting the frequency range thereof in accordance with the attenuation characteristics of said transmission lines.

39. The method of claim 33 wherein the step of combining further comprises the step of preselecting bandwidths of the signals received by the antenna prior to combination with the local oscillator signal.

40. The method of claim 39 wherein the step of preselecting comprises the steps of receiving a drive signal from set of transmission lines and preselecting the bandwidths in accordance therewith.

41. The method of claim 40 further comprising the steps of generating said drive signal at said central portion and transmitting same over said set of transmission lines.

42. The method of claim 33 wherein the step of receiving said IF signal further comprises the step of time sharing the IF signals from each of the remote portions.

43. The method of claim 39 wherein the step of combining further comprises the step of tank circuit filtering of the local oscillator signal with one additional tuned preselector.

44. The method of claim 43 wherein said bandwidth preselection is accomplished in accordance with said drive signal.

45. The method of claim 33 wherein the step of processing the IF signal comprises generating the frequency determining signal in accordance with the processed IF signal.

46. The method of claim 33 wherein the step of processing the IF signal comprises displaying a function of the processed IF signal at the central portion.

* * * * *